…

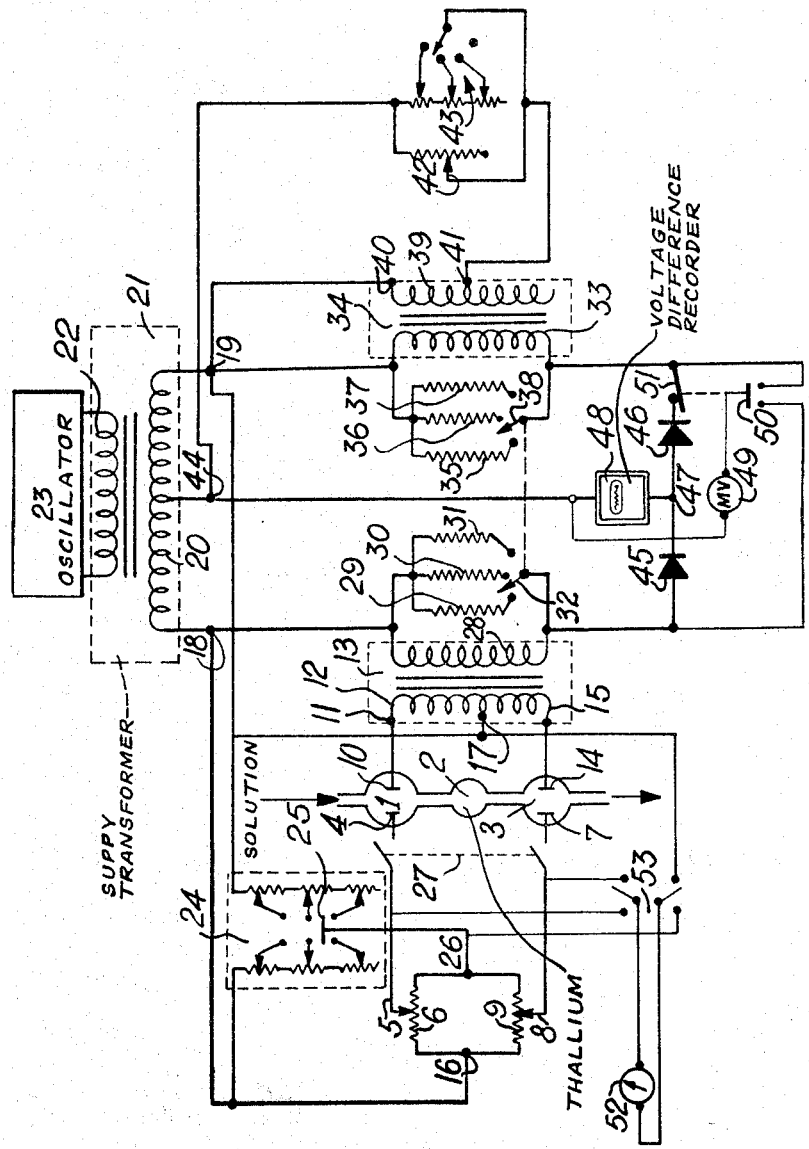

United States Patent Office 3,265,963
Patented August 9, 1966

3,265,963
DEVICE FOR CONTINUOUSLY MEASURING THE DIFFERENCE BETWEEN THE CONDUCTIVITIES OF TWO LIQUIDS
Jean Chenouard, Clamart, and Roger Gabilly, l'Hay-les-Roses, France, assignors to Commissariat a l'Energie Atomique, Paris, France
Filed Apr. 12, 1962, Ser. No. 187,118
Claims priority, application France, Apr. 24, 1961, 859,627
7 Claims. (Cl. 324—30)

The present invention relates to a device enabling the difference between two conductivities to be measured in continuous fashion by means of an electrical arrangement which delivers a voltage proportional to the said difference.

When carrying out quantitative analyses in a liquid medium, in particular when the liquid being studied is circulating in a pipe, it is known often to be advantageous to reduce the problem to measurements of conductivity. In fact, the latter is a function of the concentration of the solution, and in addition this is an easily measurable quantity.

To this end, it is known to pass the solution into a conductivity cell, and to incorporate the cell in an electrical circuit which delivers a voltage having a value linked to that of the concentration of the solution.

It is likewise known to use two circuits, one comprising a cell containing the liquid to be studied, and the other a cell containing a reference liquid (pure solvent for example), which enables an absolute measurement of concentration to be obtained by comparing the results.

It will be understood that in the general case it would be advantageous directly to produce a voltage proportional to the difference between the two conductivities, measurement of the said voltage then giving the value of the unknown concentration at any instant.

The present invention relates to a device for continuously measuring the difference between two conductivities, more particularly applicable to quantitative analyses in a liquid medium, and giving a direct reading with high sensitivity.

The said device, of the type comprising two conductivity cells with the two liquids to be compared passing respectively through them, is essentially characterized in that it comprises a comparison bridge and a measuring bridge, both fed with an alternating voltage of adjustable amplitude and stable frequency appearing between the terminals of the secondary of a supply transformer, and in that the four arms of the comparison bridge are made up of two conductivity cells and the two windings forming the primary of a second transformer whereof the secondary forms part of the measuring bridge.

According to another feature of the invention, the secondary of the second transformer is in series with a rectifier and forms one arm of the second bridge, the adjacent arm of the latter being made up of the secondary, in series with a second rectifier, of a transformer whereof the primary is fed with a variable voltage by the supply transformer, the other two arms of the said second bridge being made up of the two halves of the secondary of the said supply transformer, and the said rectifiers being so arranged as to give a steady voltage in the measuring diagonal of the said second bridge proportional to the difference between the voltages produced by the secondaries of the second and third transformers, the said steady voltage being applied to a measuring instrument.

In addition, the secondaries of the second and third transformers may comprise adjustable load resistances, in order to make the rectifiers always work in a linear region of their characteristics.

The system of measurement by comparison according to the invention exhibits the advantages of automatically eliminating undesired signals and certain temperature effects and it gives a wide range of measurement, while preserving the same absolute sensitivity.

A non-limiting example of use of the device for continuously measuring the difference between two conductivities to which the invention relates, applied to quantitative analysis of a solution of oxygen in water, will be described hereinafter with reference to the appended single figure. The arrangements which will be described in connection with this example must be considered as forming part of the invention, it being understood that any equivalent arrangements may just as well be used without departing from the scope of the invention.

The single figure diagrammatically illustrates a device according to the invention.

The solution to be quantitatively analysed is introduced into a first conductivity cell 1. The said solution then passes through a column 2 containing a reagent capable of altering the conductivity of the solution in proportion to the quantity of dissolved substances. In the present form of embodiment, this reagent takes the form of thallium: the latter combines with oxygen and yields in water a soluble and ionised hydroxide. The new solution then passes into a second conductivity cell 3, which is preferably kept at the same temperature as the cell 1. If this temperature condition is not fulfilled, an automatic temperature-compensation system may be provided, for example using the variation in characteristics of a transistor. Continuous measurement of the difference between the conductivities of the liquids passing into the cells 1 and 3 respectively will enable the concentration of oxygen in the solution to be determined at any instant.

This measurement is carried out with the aid of the arrangement described hereinafter.

One of the electrodes 4 of the cell 1 is connected to the slider 5 of a resistance 6. Likewise, one of the electrodes 7 of the cell 3 is connected to the slider 8 of another resistance 9. The two resistances 6 and 9 are connected in parallel.

Moreover, the other electrode 10 of the cell 1 is connected to one of the terminals 11 of the primary winding 12 of a transformer 13, while the other electrode 14 of the cell 3 is connected to the other terminal 15 of the winding 12.

One of the junctions 16 of the resistances 6 and 9 and the center tap 17 of the winding 12 are connected to the terminals 18 and 19 respectively of the secondary winding 20 of a supply transformer 21. The primary 22 of this transformer is fed by a stable oscillator 23 working at a frequency which can be adjusted to a definite value, for example 1000 c.p.s.

A potentiometer 24, giving three degrees of sensitivity, which is connected across the secondary winding 20 of the transformer 21, and whereof the sensitivity switch 25 is connected to the second junction 26 of the resistances 6 and 9, enables the voltage across the terminals of the cells to be varied within wide limits with a satisfactory degree of accuracy. A double-pole switch 27 enables the cells to be connected to voltage or isolated therefrom.

The points 26, 11, 17 and 15 form the four apices of a measuring bridge, and when this bridge is unbalanced, due to differences in conductivity of the two cells, a voltage is induced in the secondary winding 28 of the transformer 13. Three load resistances 29, 30 and 31 may be separately placed in parallel with the winding 28 by means of a change-over switch 32.

The voltage induced in the winding 28 is measured by comparison with a fixed voltage supplied by the secondary winding 33 of a transformer 34 identical with the transformer 13. Three load resistances 35, 36 and 37, identical with the resistances 29, 30 and 31 respectively, may be separately placed in parallel with the winding 33 by means of a change-over switch 38 ganged to the switch 32.

The primary winding 39 of the transformer 34 is fed by the transformer 21 in the following manner: the terminal 40 of the winding 39 is connected to the terminal 19 of the winding 20. The center tap 41 of the winding 39 is connected via two rheostats 42 and 43 in parallel, the latter comprising three degrees of sensitivity, to the center tap 44 of the winding 20. This arrangement gives better symmetry in the comparison circuit and maximum elimination of interfering signals.

The winding 28 is connected on the one hand to the terminal 18 of the transformer 21 and on the other hand to a rectifier 45, while the winding 33 is connected on the one hand to the terminal 19 of the transformer 21 and on the other hand to another rectifier 46, the two rectifiers 45 and 46 having a junction 47 connecting together two terminals of opposite signs. The points 47, 18, 44 and 19 form the four apices of a bridge, and when this bridge is unbalanced a steady voltage appears between the terminals 44 and 47. Between these two terminals is connected a measuring instrument, preferably a recorder 48, which will give indications proportional to the difference between the voltages respectively induced in the windings 28 and 33.

An electrical arrangement according to the invention gives a voltage across the secondary of the second transformer proportional to the difference between the conductivities of the cells: in fact, let $U_1$ and $U_2$ be the voltages respectively applied to the two circuits made up of the first cell and the first half-winding of the second transformer on the one hand, and the second cell and the second half-winding on the other hand. If $R_1$ and $R_2$ are the resistances of the cells and Z the impedance of each half-winding, the voltages $u_1$ and $u_2$ across the terminals of the two half-windings will be:

$$u_1 = \frac{U_1 Z}{R_1 + Z} \quad (1)$$

and $$u_2 = \frac{U_2 Z}{R_2 + Z} \quad (2)$$

The impedance Z is negligible with respect to $R_1$ and $R_2$, so we may ignore it in the denominator and write (1) and (2), without substantially changing their value, as:

$$u_1 = \frac{U_1 Z}{R_1} \quad (3)$$

and $$u_2 = \frac{U_2 Z}{R_2} \quad (4)$$

or $$u_1 = U_1 G_1 Z \quad (5)$$

and $$u_2 = U_2 G_2 Z \quad (6)$$

$G_1$ and $G_2$ being the respective conductances of the cells. By preliminary adjustment, $U_1$ and $U_2$ are chosen so that $$U_1 G_1 = k g_1 \quad (7)$$

and $$U_2 G_2 = k g_2 \quad (8)$$

$g_1$ and $g_2$ being the conductivities of the liquids in the cells, and $k$ a constant.

It is then deduced from this that $u_1 = K g_1$ and $u_2 = K g_2$ ($K$=constant).

According to the arrangement, the voltages $u_1$ and $u_2$ are in opposite phase, so the resultant voltage will be:

$$u = u_2 - u_1 = K (g_2 - g_1) \quad (10)$$

The secondary voltage of the second transformer, which will likewise be proportional to the difference between the conductivities, may be directly measured, for example with the aid of a millivoltmeter.

According to the invention, it is desirable to achieve extreme sensitivity and it is, therefore of advantage to compare this voltage in a bridge with a fixed voltage in phase with the latter and of accurately controlled value. This fixed voltage is delivered by a third transformer and can be controlled within wide limits by means of variable resistance, for example in the transformer circuit. Such a system permits measuring different conductivities which vary within large limits while insuring that the measurement is made under the same conditions.

Suitable calibration enables readings of concentration to be taken directly.

A certain number of preliminary adjustments are required before the device is set in operation. These adjustments consist chiefly in successively balancing the two bridges in order to eliminate undesirable effects due to interfering signals or to the intrinsic characteristics of the instruments being used. The said adjustments may be carried out in the following manner: The whole device being fed by the transformer 21, the switch 27 is opened, the resistances 43 are taken out of circuit, and the resistance 42 is varied so that there is no deflection on the measuring instrument, which in this case is an electronic millivoltmeter 49 connected as shown in the single figure. Two switches 50 and 51 enable the measurement to be carried out, while taking the instrument 48 and the rectifiers 45 and 46 out of circuit. This first adjustment eliminates a large number of interfering signals. The cells 1 and 3 both being filled with the same liquid, the switch 27 is closed, and the millivoltmeter 49 is again brought to zero with the aid of the sliders 5 and 8 of the resistances 6 and 9. This adjustment in particular enables unbalances due to differences in the characteristics of the cells to be eliminated.

The potentiometer 24, the load resistances of the transformers 13 and 34 and the resistances 43 are naturally adjusted as a function of the concentrations in use, and of the amplitude by which their differences vary.

A second electronic millivoltmeter 52 associated with a double reversing switch 53 enables the voltages between various points on the bridge comprising the cells to be read off for reference purposes.

What we claim is:

1. Apparatus for the continuous measurement of the difference between the conductivities of two liquids, comprising: two conductivity cells and means for directing said liquids through said cells; a supply transformer having primary and secondary windings; a first bridge having four branches which are respectively constituted by the said two conductivity cells and two coils, said two coils defining the primary winding of a second transformer having also a secondary winding; feeding means controllable from the first bridge connected to the secondary winding of said supply transformer; a comparison bridge having four branches which are defined, respectively, by the secondary winding of said second transformer, two identical coil portions, of the secondary winding of said supply transformer, and a coil comprising the secondary winding of a temperature controlled third transformer which also has a primary winding; and a measuring device connected across a comparison diagonal of said comparison bridge.

2. Apparatus according to claim 1 wherein the supply transformer is connected to the comparison bridge through a potentiometer adjustable to several degrees of sensitivity.

3. Apparatus in accordance with claim 1 in which the secondary windings of the second and third transformers include calibrating means; said calibrating means having a common junction; and a galvanometer connected between the said common junction and the middle point of the secondary winding of said supply transformer, the voltage measured thereby being proportional to the difference of the voltages produced by the secondary windings of the second and third transformers.

4. Apparatus according to claim 3 wherein said second and third transformers are identical.

5. Apparatus according to claim 3, wherein the secondaries of the second and third transformers are connected to adjustable load resistances capable of being adjusted to identical values.

6. Apparatus accroding to claim 3, wherein the primary winding of the third transformer is fed by one half of the secondary winding of the supply transformer.

7. Apparatus according to claim 3, including variable resistance means connected to the primary winding of said third transformer to regulate the voltage applied thereto.

References Cited by the Examiner

UNITED STATES PATENTS

| | | | |
|---|---|---|---|
| 2,422,873 | 6/1947 | Wolfner | 324—30 |
| 2,450,459 | 10/1948 | Thomson | 324—30 |
| 2,902,639 | 9/1959 | Thayer et al. | 324—30 |
| 2,949,765 | 8/1960 | Thayer et al. | 324—30 X |
| 2,950,176 | 8/1960 | Thayer et al. | 324—30 |
| 3,056,919 | 10/1962 | Kuipers | 324—30 |

WALTER L. CARLSON, *Primary Examiner.*

FREDERICK M. STRADER, *Examiner.*

C. F. ROBERTS, *Assistant Examiner.*